US012705362B2

(12) United States Patent
Ahn et al.

(10) Patent No.: US 12,705,362 B2
(45) Date of Patent: Aug. 11, 2026

(54) METHOD, APPARATUS, SYSTEM AND COMPUTER PROGRAM FOR IDENTIFYING AND RESPONDING TO QUANTUM VULNERABILITY USING DYNAMIC ANALYSIS FOR APPLICATION

(71) Applicant: SAMSUNG SDS CO., LTD., Seoul (KR)

(72) Inventors: Janghyuk Ahn, Seoul (KR); Young Hwa Lee, Seoul (KR); Changhoon Lee, Seoul (KR); Hyojin Yoon, Seoul (KR); Jihoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 39 days.

(21) Appl. No.: 18/664,129

(22) Filed: May 14, 2024

(65) Prior Publication Data

US 2025/0021661 A1 Jan. 16, 2025

(30) Foreign Application Priority Data

Jul. 12, 2023 (KR) ........................ 10-2023-0090528
Oct. 31, 2023 (KR) ........................ 10-2023-0147941

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC ................. G06F 21/577; G06F 21/566; G06F 2221/034; H04L 9/0852; H04L 9/002
See application file for complete search history.

(56) References Cited

U.S. PATENT DOCUMENTS 8,397,300 B2 3/2013 Tripp
11,322,050 B1 5/2022 Arbajian et al.
(Continued)

FOREIGN PATENT DOCUMENTS

EP 4 439 353 A1 10/2024
KR 10-2019-0111685 10/2019

OTHER PUBLICATIONS

Extended European Search Report Issued on Nov. 21, 2024, in Counterpart European Patent Application No. 24181670.1 (5 Pages in English).

(Continued)

*Primary Examiner* — Jung W Kim
*Assistant Examiner* — James P Moles
(74) *Attorney, Agent, or Firm* — NSIP Law

(57) ABSTRACT

The disclosure relates to a method, an apparatus, a system, and a computer program for identifying and responding to quantum vulnerability with respect to an application by using a dynamic analysis agent and, specifically, as a method of identifying quantum vulnerability with respect to an application by using a computing apparatus, the disclosure may include an operation of identifying one or more cryptographic associated functions performed in an application based on analysis of a code, executed while the application is in an operating state, by using a dynamic analysis agent corresponding to the application, an operation of calculating, based on the one or more cryptographic associated functions, a cryptography algorithm list used in the application, and an operation of identifying, based on the cryptography algorithm list, quantum vulnerability with respect to the application.

17 Claims, 10 Drawing Sheets

(56) References Cited

U.S. PATENT DOCUMENTS

| | | | | |
|---|---|---|---|---|
| 11,550,903 | B1 * | 1/2023 | Epstein | G06F 21/57 |
| 2011/0072517 | A1 * | 3/2011 | Tripp | G06F 11/3636 726/25 |
| 2017/0187743 | A1 * | 6/2017 | Madou | G06F 21/566 |
| 2020/0202007 | A1 * | 6/2020 | Nagaraja | G06F 8/71 |
| 2021/0232695 | A1 * | 7/2021 | Eldefrawy | G06F 21/602 |
| 2023/0109647 | A1 * | 4/2023 | Ott | H04L 9/0618 713/189 |
| 2023/0254132 | A1 * | 8/2023 | Ramanathan | H04L 9/0869 380/28 |
| 2024/0061731 | A1 * | 2/2024 | Huntley | G06F 9/546 |
| 2024/0333484 | A1 * | 10/2024 | Kim | H04L 9/0852 |
| 2025/0103720 | A1 * | 3/2025 | Bordow | G06F 21/577 |

OTHER PUBLICATIONS

Kosztin, Bela, "Quantum Computing's Challenge to Cryptography", WorldQuant, Leadership, Aug. 27, 2021. (pp. 1-15).

Singapore Office Action issued on Mar. 14, 2026, in counterpart Singapore Patent Application No. SG 10202401258W (12 pages in English).

* cited by examiner

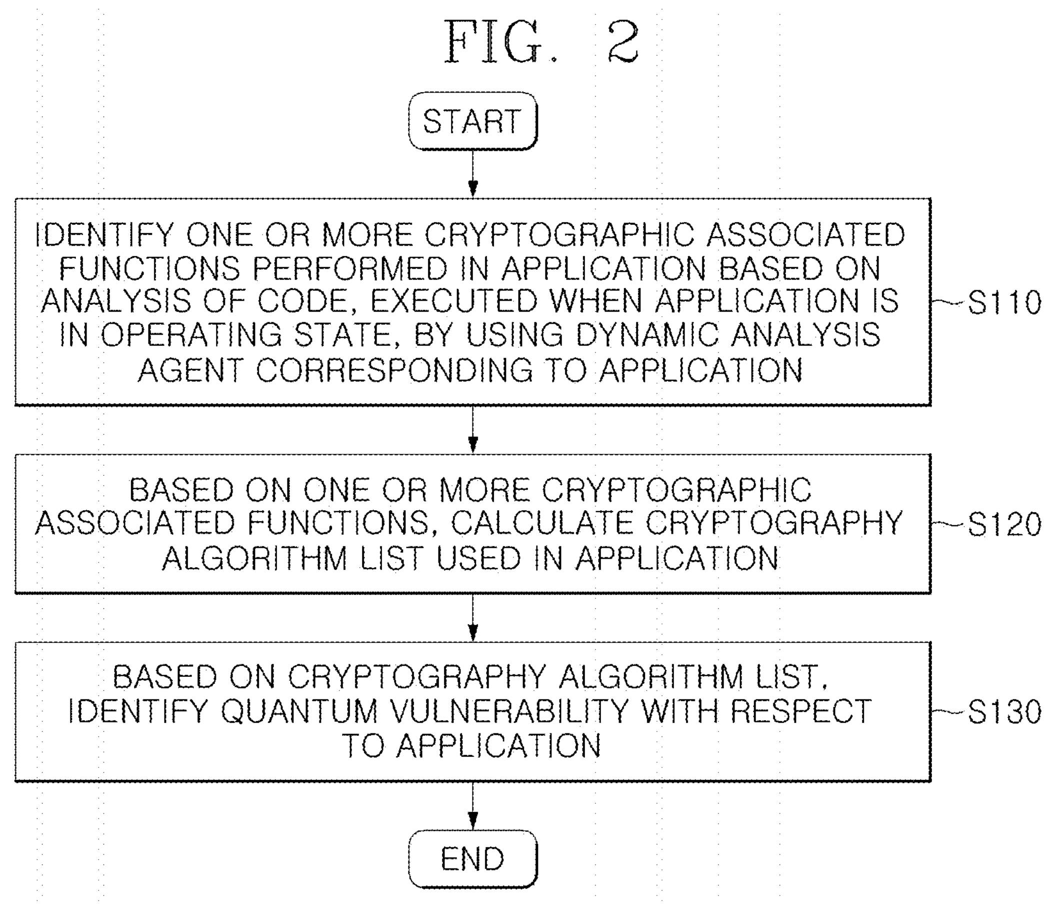
FIG. 2
START
IDENTIFY ONE OR MORE CRYPTOGRAPHIC ASSOCIATED FUNCTIONS PERFORMED IN APPLICATION BASED ON ANALYSIS OF CODE, EXECUTED WHEN APPLICATION IS IN OPERATING STATE, BY USING DYNAMIC ANALYSIS AGENT CORRESPONDING TO APPLICATION
S110
BASED ON ONE OR MORE CRYPTOGRAPHIC ASSOCIATED FUNCTIONS, CALCULATE CRYPTOGRAPHY ALGORITHM LIST USED IN APPLICATION
S120
BASED ON CRYPTOGRAPHY ALGORITHM LIST, IDENTIFY QUANTUM VULNERABILITY WITH RESPECT TO APPLICATION
S130
END

FIG. 3

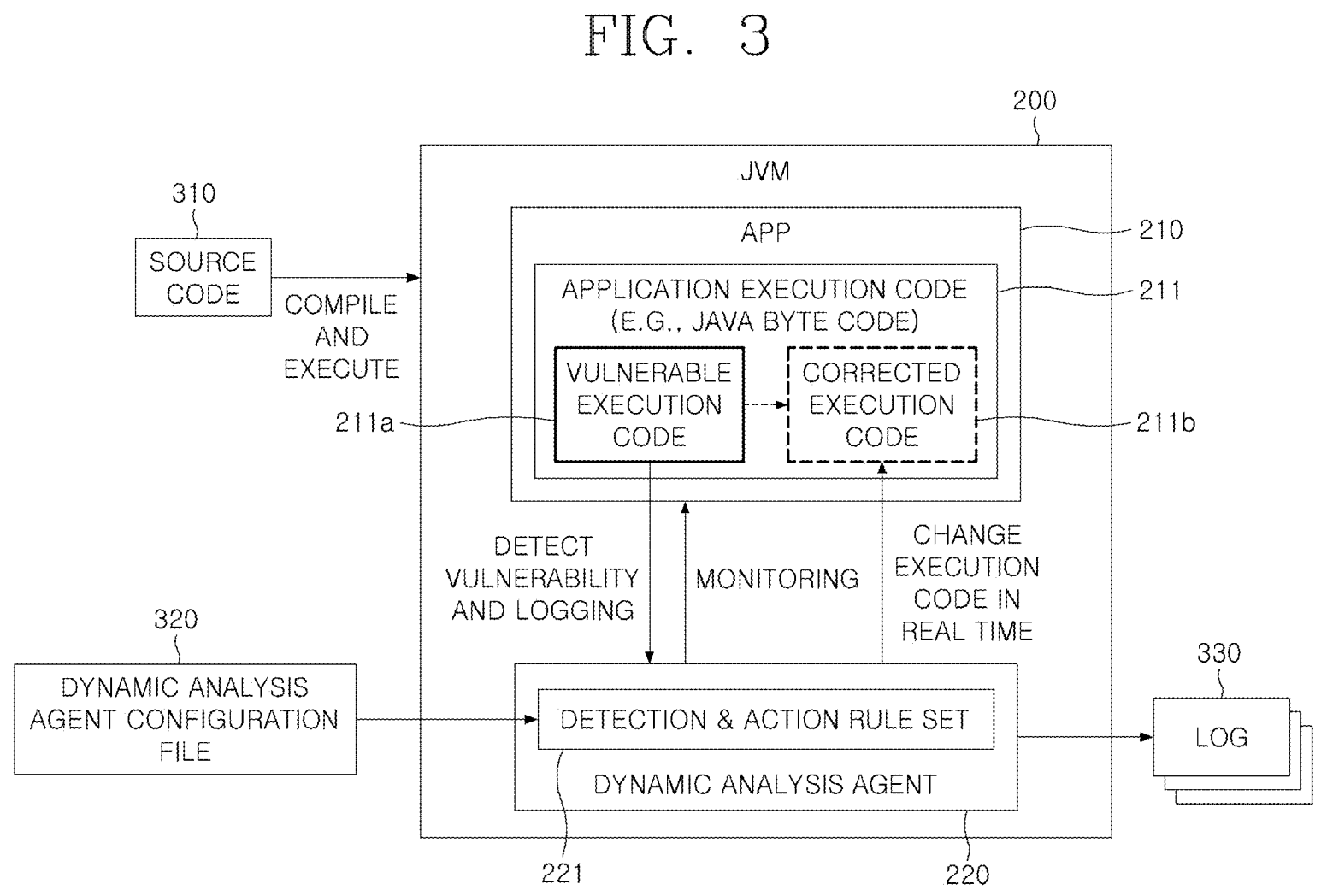

200
JVM
210
APP
211
APPLICATION EXECUTION CODE (E.G., JAVA BYTE CODE)
211a
VULNERABLE EXECUTION CODE
211b
CORRECTED EXECUTION CODE
220
DYNAMIC ANALYSIS AGENT
221
DETECTION & ACTION RULE SET
MONITORING
CHANGE EXECUTION CODE IN REAL TIME
DETECT VULNERABILITY AND LOGGING
310
SOURCE CODE
COMPILE AND EXECUTE
320
DYNAMIC ANALYSIS AGENT CONFIGURATION FILE
330
LOG

FIG. 4

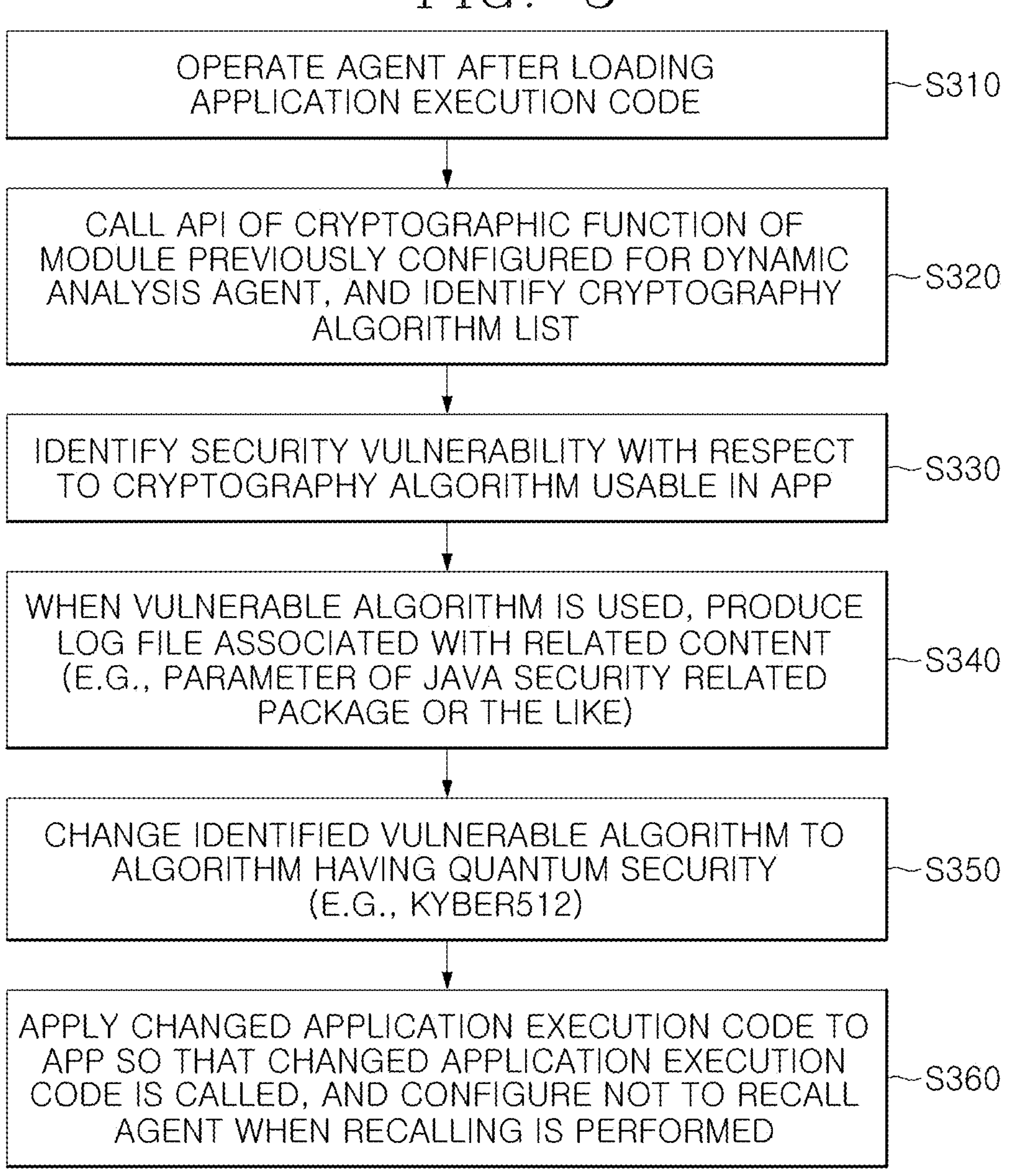
FIG. 5
OPERATE AGENT AFTER LOADING APPLICATION EXECUTION CODE
S310
CALL API OF CRYPTOGRAPHIC FUNCTION OF MODULE PREVIOUSLY CONFIGURED FOR DYNAMIC ANALYSIS AGENT, AND IDENTIFY CRYPTOGRAPHY ALGORITHM LIST
S320
IDENTIFY SECURITY VULNERABILITY WITH RESPECT TO CRYPTOGRAPHY ALGORITHM USABLE IN APP
S330
WHEN VULNERABLE ALGORITHM IS USED, PRODUCE LOG FILE ASSOCIATED WITH RELATED CONTENT (E.G., PARAMETER OF JAVA SECURITY RELATED PACKAGE OR THE LIKE)
S340
CHANGE IDENTIFIED VULNERABLE ALGORITHM TO ALGORITHM HAVING QUANTUM SECURITY (E.G., KYBER512)
S350
APPLY CHANGED APPLICATION EXECUTION CODE TO APP SO THAT CHANGED APPLICATION EXECUTION CODE IS CALLED, AND CONFIGURE NOT TO RECALL AGENT WHEN RECALLING IS PERFORMED
S360

FIG. 6

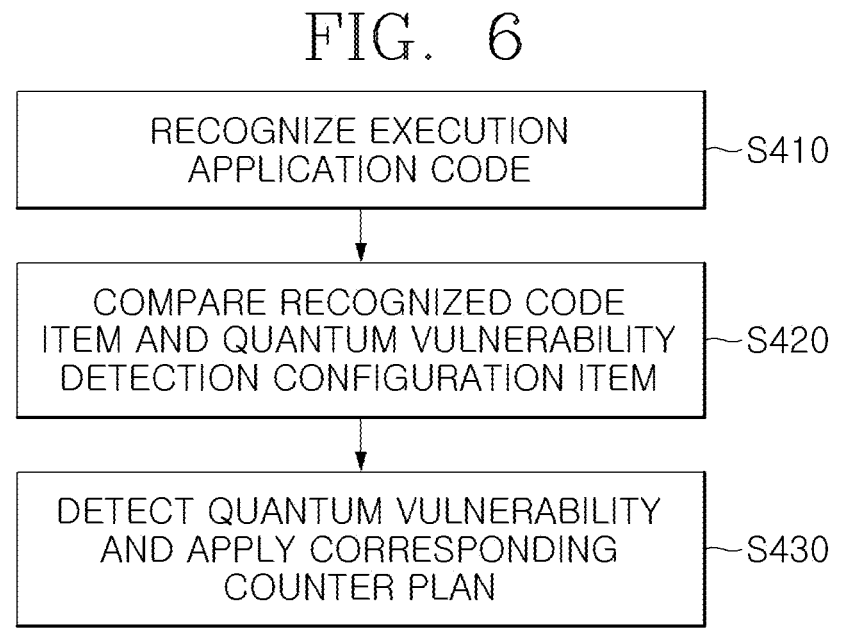

RECOGNIZE EXECUTION APPLICATION CODE ~S410

COMPARE RECOGNIZED CODE ITEM AND QUANTUM VULNERABILITY DETECTION CONFIGURATION ITEM ~S420

DETECT QUANTUM VULNERABILITY AND APPLY CORRESPONDING COUNTER PLAN ~S430

FIG. 7

| | MODULE NAME | METHOD NAME | METHOD PARAMETER TYPE | METHOD RETURN TYPE | RESPONSE TYPE AFTER DETECTION |
|---|---|---|---|---|---|
| (A) | moduleA<br>(ex. Verifier) | methodB<br>(ex. verify) | paramC<br>paramD<br>...<br>(ex. String. bytes) | value<br>(ex. bool) | CHANGE CODE IN REAL TIME AFTER LOGGING |
| | moduleF<br>(ex. Signer) | methodG<br>(ex. sign) | paramH<br>paramI<br>...<br>(ex. String. int) | value<br>(ex. bytes) | CHANGE CODE IN REAL TIME AFTER LOGGING |

FIG. 8

| | MODULE NAME | METHOD NAME | METHOD PARAMETER VALUE | METHOD RETURN VALUE | RESPONSE TYPE AFTER DETECTION |
|---|---|---|---|---|---|
| (A) | moduleF<br>(ex. Signer) | methodG<br>(ex. sign) | paramH<br>paramI<br>...<br>(ex. RSA ♂/ 2048) | valueJ<br>(ex. bytes) | APPLY CHANGING CODE AFTER LOGGING<br>※ CHANGE RSA/2048 PARAMETER TO KYBER/512 AND APPLY |
| (B) | moduleF | methodG<br>(ex. sign) | paramH<br>paramI<br>...<br>(ex. kyber♂/ 512) | valueJ<br>(ex. bytes) | APPLY CHANGING CODE AFTER LOGGING<br>※ REASON: QUANTUM SAFETY ALGORITHM (KYBER/512) IS ALREADY APPLIED |

SecretKey aesKey = keyGenerator.generateKey();
Cipher cipher = Cipher.getInstance("RSA");
cipher .init(1, bobPublicKey);
byte[] encrypteKey = cipher.doFinal(aesKey.getEncoded());
910

SecretKey key = kg.generateKey();
Cipher w1 = Cipher.getInstance("KYBER", "BCPQC");
w1.init(3, kp.getPublic(), (AlgorithmParameterSpec)ktsParameterSpec);
byte[] data = w1.wrap(key);
920

FIG. 10

METHOD, APPARATUS, SYSTEM AND COMPUTER PROGRAM FOR IDENTIFYING AND RESPONDING TO QUANTUM VULNERABILITY USING DYNAMIC ANALYSIS FOR APPLICATION

CROSS-REFERENCE TO RELATED APPLICATION(S)

This application is based on and claims priority under 35 U.S.C. 119 to Korean Patent Application No. 10-2023-0090528, filed on Jul. 12, 2023, and Korean Patent Application No. 10-2023-0147941, filed on Oct. 31, 2023, in the Korean Intellectual Property Office, the disclosure of which is herein incorporated by reference in its entirety.

BACKGROUND OF THE INVENTION

1. Field of the Invention

The present disclosure relates to a method, apparatus, system, and computer program for identifying and responding to quantum vulnerability with respect to an application by using a dynamic analysis agent and, more particularly, the present disclosure relates to a method, apparatus, system, and computer program for identifying and responding to quantum vulnerability with respect to an application by using a dynamic analysis agent, which effectively identify and respond to quantum vulnerability in real time, while operating the application and the dynamic analysis agent via interoperation.

2. Description of the Prior Art

Recently, various services have been provided based on wired or wireless communication networks and thus, the importance of security has been continuously grown. Accordingly, various security algorithms have been developed and applied.

However, labor force and resources utilizable when a manager or the like manages security of an application to provide a service or the like may be limited, inevitably. Therefore, there is a need to effectively resolve various security risks associated with multiple applications with a limited amount of resource, which is a constraint.

In addition, as quantum computing technology has developed, the risk of paralyzing an existing cryptosystem has been realized based on the development of quantum computing. Accordingly, there is provided a scheme of responding to a security risk by applying post-quantum cryptography (PQC) technology.

However, a large amount of resource such as labor force, time, and the like may be required to identify quantum vulnerability with respect to various applications which are already established and operated, and to respond to the same by applying the POC scheme to an application of which quantum vulnerability is identified. Therefore, a manager may have hard time efficiently identifying quantum vulnerability with respect to various applications, and effectively responding to the same by applying the POC scheme to an application of which vulnerability is identified.

Accordingly, there is a need for a scheme capable of efficiently identifying and responding to quantum vulnerability with respect to various applications, but an appropriate resolution thereto has not been provided yet.

SUMMARY OF THE INVENTION

The present disclosure has been made in order to solve the above-mentioned problems in the prior art and an aspect of the present disclosure is to provide a method, apparatus, system, and computer program for identifying and responding to quantum vulnerability with respect to an application by using a dynamic analysis agent, which efficiently identify and respond to quantum vulnerability with respect to various applications.

In addition, an aspect of the present disclosure is to provide a method, apparatus, system, and computer program for identifying and responding to quantum vulnerability with respect to an application by using a dynamic analysis agent, which identify and supplement quantum vulnerability in real time with respect to even an application that currently operates.

In addition, an aspect of the present disclosure is to provide a method, apparatus, system, and computer program for identifying and responding to quantum vulnerability with respect to an application by using a dynamic analysis agent, which efficiently identify and verify quantum vulnerability with respect an application in an application development process or in a post-development verification process.

The technical subject matter of the present disclosure is not limited to the above-mentioned technical subject matters, and other technical subject matters which are not mentioned may be understood by those skilled in the art based on the following description.

As a first aspect of the disclosure, there is provided a method of identifying quantum vulnerability with respect to an application by using a computing apparatus, and the method includes an operation of identifying one or more cryptographic associated functions performed in an application based on analysis of a code, executed while the application is in an operating state, by using a dynamic analysis agent corresponding to the application, an operation of calculating, based on the one or more cryptographic associated functions, a cryptography algorithm list used in the application, and an operation of identifying, based on the cryptography algorithm list, quantum vulnerability with respect to the application.

Here, the method may further include an operation of correcting, by using the operation analysis agent, a code area corresponding to the quantum vulnerability identified in the application that is in the operating state.

In addition, the dynamic analysis agent may identify quantum vulnerability with respect to the application by using a rule set configured based on a predetermined configuration file for the application.

In addition, the application and the dynamic analysis agent may be configured to interoperate with each other in one same process.

In this instance, the dynamic analysis agent may identify quantum vulnerability with respect to the application that is in the operating state by using intercepting for the application.

In addition, the corrected code area may be applied to the application, and configuration may be performed not to recall the dynamic analysis agent when the application is recalled.

In addition, a degree of effect on the application may be verified by using a code to which the corrected code area is applied.

In addition, in the calculating operation, the dynamic analysis agent may calculate a cryptography algorithm list used for the application while calling and executing an API of the one or more cryptographic associated functions.

As a second aspect of the disclosure, there is provided a server including a processor and a memory, and configured to identify quantum vulnerability with respect to an application, wherein the memory may include instructions configured to cause, when executed by the processor, the server to perform a predetermined operation which includes an operation of identifying one or more cryptographic associated functions executed in the application based on analysis of a code, executed while the application is in an operating state, by using a dynamic analysis agent corresponding to the application, an operation of calculating, based on the one or more cryptographic associated functions, a cryptography algorithm list used in the application, and an operation of identifying, based on the cryptography algorithm list, the quantum vulnerability with respect to the application.

Here, the server may further include an operation of correcting, by using the dynamic analysis agent, a code area corresponding to the quantum vulnerability identified in the application that is in the operating state.

In addition, the dynamic analysis agent may identify the quantum vulnerability with respect to the application by using a rule set configured based on a predetermined configuration file for the application.

In addition, the application and the dynamic analysis agent may be configured to interoperate with each other in one same process.

In this instance, the dynamic analysis agent may identify the quantum vulnerability with respect to the application that is in the operating state, by using intercepting for the application.

In addition, the corrected code area may be applied to the application, and configuration may be performed so as not to recall the dynamic analysis agent when the application is recalled.

In addition, a degree of effect on the application may be verified using a code to which the corrected code area is applied.

In addition, in the calculating operation, the dynamic analysis agent may calculate a cryptography algorithm list used for the application while calling and executing an API of the one or more cryptographic associated functions.

As a third aspect of the disclosure, there is provided a computer-readable storing medium that stores instructions configured to, when executed by a processor, cause a server to implement a predetermined operation, wherein the server includes the processor and identifies quantum vulnerability with respect to an application, and the predetermined operation includes an operation of identifying one or more cryptographic associated functions executed in the application based on analysis of a code, executed when the application is in an operating state, by using a dynamic analysis agent corresponding to the application, an operation of calculating, based on the one or more cryptographic associated functions, a cryptography algorithm list used in the application, and an operation of identifying, based on the cryptography algorithm list, quantum vulnerability with respect to the application.

Accordingly, a method, apparatus, system, and computer program for identifying and responding to quantum vulnerability with respect to an application by using a dynamic analysis agent according to an embodiment of the present disclosure may efficiently identify and respond to quantum vulnerability with respect to various applications.

In addition, a method, apparatus, system, and computer program for identifying and responding to quantum vulnerability with respect to an application by using a dynamic analysis agent according to an embodiment of the present disclosure may efficiently identify and supplement quantum vulnerability in real time with respect to even an application that currently operates.

In addition, a method, apparatus, system, and computer program for identifying and responding to quantum vulnerability with respect to an application by using a dynamic analysis agent according to an embodiment of the present disclosure may efficiently identify and supplement quantum vulnerability in real time with respect to even an application that currently operates.

Effects that could be obtained based on the present disclosure are not limited to the above-described effects, and based on the descriptions provided below, those skilled in the art would clearly understand other effects which are not mentioned.

BRIEF DESCRIPTION OF THE DRAWINGS

The above and other aspects, features, and advantages of the present disclosure will be more apparent from the following detailed description taken in conjunction with the accompanying drawings, in which:

FIG. 2 is a flowchart illustrating a quantum vulnerability identifying method according to an embodiment of the present disclosure;

FIG. 3 is a diagram illustrating configurations and operations of an application and a dynamic analysis agent according to an embodiment of the present disclosure;

FIG. 4 and FIG. 5 are flowcharts illustrating quantum vulnerability identifying methods according to an embodiment of the present disclosure;

FIGS. 6 to 9 are diagrams illustrating detailed examples of a quantum vulnerability identifying method according to an embodiment of the present disclosure; and FIG. 10 is a diagram illustrating a configuration of a computing apparatus that identifies quantum vulnerability according to an embodiment of the present disclosure.

DETAILED DESCRIPTION OF THE EXEMPLARY EMBODIMENTS

Figure 1:
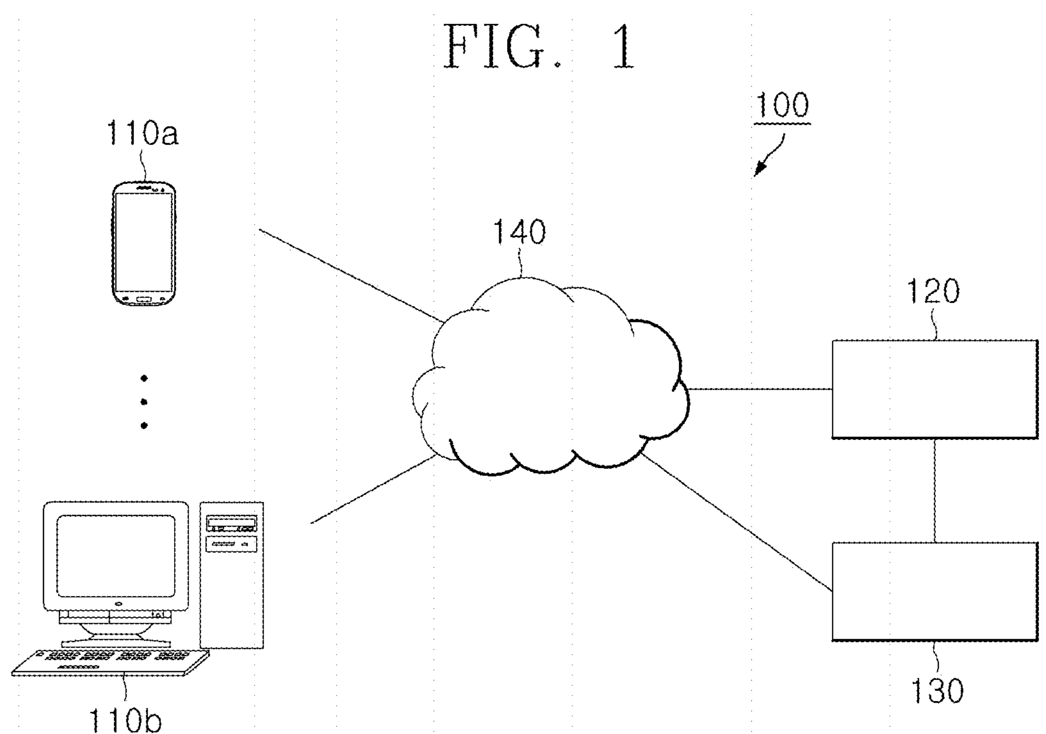
FIG. 1 is a diagram illustrating a configuration of a quantum vulnerability identifying system according to an embodiment of the present disclosure.

Hereinafter, various embodiments will be described in detail with reference to the accompanying drawings. The purposes, specific advantages, and new features of the present disclosure may be clearly understood from detailed descriptions and preferable embodiments associated with the attached drawings.

Terms or words used in the present specification and claims, which are concepts appropriately defined by an inventor in order to describe the present disclosure best, should be construed as the meanings and concepts that agree with the technical idea of the present disclosure. The terms and words are merely to describe embodiments and should not be understood as limiting the present disclosure.

When assigning reference numerals to components, like reference numerals may refer to like or similar components, and duplicate description thereof will be omitted. Ending words used for a component, such as "module" and "unit", are assigned or interchangeably used for ease of drafting the specifications, may not have distinguishing meanings or roles, and may be software or hardware components.

When describing components of the present disclosure, a component expressed in the singular form is intended to include components expressed in the plural forms as well, unless otherwise described. In addition, the terms "first", "second", and the like are used for distinguishing one component from another component, and components are not limited to the above-mentioned terms. In addition, in the case in which a component is connected to another component, yet another component may be connected between the component and the other component.

In addition, when detailed descriptions related to a well-known technical art is identified as making the subject matter of the embodiments disclosed in the present specification ambiguous, the detailed descriptions thereof will be omitted herein. In addition, the attached drawings are merely to help understanding of embodiments disclosed in the present specification, and it should be understood, however, that there is no intention to limit technical idea disclosed in the present specification but all modifications, equivalents, and alternatives falling within the scope of the ideas and technology of the present disclosure are included.

Hereinafter, embodiments of a method, apparatus, system, and computer program for identifying and responding to quantum vulnerability with respect to an application by using a dynamic analysis agent according to the present disclosure will be described in detail with reference to enclosed drawings.

FIG. 1 illustrates a configuration and operations of a quantum vulnerability identifying system 100 according to an embodiment of the present disclosure. As illustrated in FIG. 1, the quantum vulnerability identifying system 100 according to an embodiment of the present disclosure may be configured with an application server 120 that operates an application for providing a service to one or more devices 110, and a quantum vulnerability identifying server 130 for identifying and responding to quantum vulnerability with respect to the application server 120.

In this instance, as the device 110, various terminals for providing a service to a user, such as a personal computer (PC), a notebook PC, a tablet PC, a smartphone, a PDA, or the like, may be used. However, the device is not necessarily limited thereto and various devices, such as a server that receives and uses data or the like provided from the application server 120, may be used as the device 110.

In addition, the application server 120 may be embodied by using a single physical server device or two or more physical server devices. However, the present disclosure is not necessarily limited thereto, and may be configured by using a personal computational processing device, such as a desktop computer, a notebook computer, a tablet, a smartphone, or the like, may be configured based on a cloud system, or may be embodied in various forms such as a dedicated device or the like.

In addition, the quantum vulnerability identifying server 130 may also be embodied by using a single physical server device, or two or more physical server devices. The quantum vulnerability identifying server 130 may also be embodied by using a cloud system or a dedicated device, and may be embodied in the form of a single server that combines the application server 120 and the quantum vulnerability identifying sever 130.

In addition, a wired network, a wireless network, or the like may be used as a network 140 that connects the one or more devices 110, the application server 120, and the quantum vulnerability identifying server 130 in FIG. 1, and, specifically, the network may 140 include various communication networks such as a local area network (LAN), a metropolitan area network (MAN), a wide area network (WAN), and the like. In addition, the network 140 may include world wide web (WWW) which is publicly known. Furthermore, the network 140 may be embodied using a data bus or the like which is configured to transmit or receive data or the like.

In addition, FIG. 2 is a flowchart illustrating a quantum vulnerability identifying method according to an embodiment of the present disclosure.

Here, the method illustrated in FIG. 2 may be performed by, for example, the quantum vulnerability identifying server 130 or the application server 120. Furthermore, the quantum vulnerability identifying server 130 or the application server 120 may be embodied by including a computing apparatus 50 which is to be described with reference to FIG. 10 and a description provided with reference to FIG. 10. For example, the quantum vulnerability identifying the server 130 or the application server 120 may include a processor 10, and the processor 10 may execute an instruction configured to implement an operation of identifying quantum vulnerability with respect to an application.

More specifically, as illustrated in FIG. 2, a quantum vulnerability identifying method according to an embodiment of the present disclosure is to identify quantum vulnerability with respect to an application 210 by using the computing apparatus 50, and may include an operation S110 of identifying one or more cryptographic associated functions executed in the application 210 based on analysis of a code 211, executed while the application 210 is in an operating state, by using a dynamic analysis agent 220 corresponding to the application 210, an operation S120 of calculating a cryptography algorithm list used in the application 210 based on the one or more cryptographic associated functions, and an operation S130 of identifying quantum vulnerability with respect to the application 210 based on the cryptography algorithm list.

Here, the method may further include an operation (not illustrated) of correcting, by using the dynamic analysis agent 220, a code area corresponding to the quantum vulnerability identified in the application 210 that is in the operating state.

In addition, the dynamic analysis agent 220 may identify quantum vulnerability with respect to the application 210 by using a rule set configured based on a predetermined configuration file for the application 210.

In addition, the application 210 and the dynamic analysis agent 220 may be configured to interoperate with each other in one same process.

In this instance, by using intercepting for the application 210, the dynamic analysis agent 220 may identify quantum vulnerability with respect to the application 210 that is in the operating state.

In addition, the corrected code area may be applied to the application 210, and configuration may be performed not to recall the dynamic analysis agent 220 when the application 210 is recalled.

In addition, the degree of effect on the application 210 may be verified by using a code to which the corrected code area is applied.

In addition, in the calculation operation S120, the dynamic analysis agent 220 may calculate a cryptography algorithm list used in the application 210 while calling and executing an API of the one or more cryptographic associated functions.

Accordingly, a method, apparatus, system, and computer program for identifying and responding to quantum vulnerability with respect to an application by using a dynamic analysis agent according to an embodiment of the present disclosure may efficiently identify and respond to quantum vulnerability with respect to various applications 210, may identify and supplement quantum vulnerability in real time with respect to even the application 210 that currently operates, and may efficiently identify and verify quantum vulnerability with respect to the application 210 in a process of developing the application 210 or a post-development verification process.

In addition, FIG. 3 illustrates a configuration and operations of the quantum vulnerability identifying system 100 according to an embodiment of the present disclosure.

Hereinafter, the configuration and operations of the quantum vulnerability identifying system 100 according to an embodiment will be described in detail with reference to FIG. 2 and FIG. 3.

In operation S110, the computing apparatus 50 may identify one or more cryptographic associated functions executed in the application 210 based on analysis of the code 211, executed when the application 210 is in an operating state, by using the dynamic analysis agent 220 corresponding to the application 210.

In this instance, the computing apparatus 50 may be the quantum vulnerability identifying server 130, the present disclosure is not necessarily limited thereto, and may be embodied in various forms such as a single server that combines the quantum vulnerability identifying server 130 and the application server 120.

Specifically, for example, as illustrated in FIG. 3, it may be embodied via a Java virtual machine (JVM) by using the Java application 210 operated in the JVM and the Java agent 220 that interoperates with the Java application. However, the present disclosure is an example and is not limited thereto, and the application 210 and the dynamic analysis agent 220 according to the present disclosure may be embodied based on various flatforms.

In this instance, as illustrated in FIG. 3, in the case in which a Java source code 310 is given, a compiling and executing process associated with the Java source code 310 is performed and the byte code 211 associated with the Java source code 310 may be executed in the JVM operated in the application server 200.

Here, in the present disclosure, as the dynamic analysis agent 220 corresponding to the application 210, a Java agent may be operated based on the Java virtual machine (JVM). In this instance, the Java agent is capable of receiving an event of the JVM or obtaining information via an inquiry, and is capable of removing a byte code that is loaded and operates in the JVM, and thus, may utilize the same for identifying and responding to quantum vulnerability with respect to the application 210 operating based on the JVM.

In this instance, in the present disclosure, the dynamic analysis agent 220 based on the Java agent receives a dynamic analysis agent configuration file 320, configures a rule set 221 to be applied to analysis of the application 210. Based thereon, the dynamic analysis agent 220 may directly identify quantum vulnerability with respect to the application 210, and may produce a result thereof as a log file 330 or the like. However, the present disclosure is not necessarily limited thereto, but may be embodied in various manners, such as the case in which the dynamic analysis agent 220 transmits collected information to the quantum vulnerability identifying server 130 and the quantum vulnerability identifying server 130 analyzes quantum vulnerability with respect to the application 210 based on the transmitted information.

In addition, in the present disclosure, in association with the quantum vulnerability identified with respect to the application 210, the degree of effect of a changed code on the performance of the application 210, on the amount of resources consumed, or the like may be verified by correcting, in real time, a code area corresponding to the identified quantum vulnerability with respect to the application 210 being in an operating state by using the dynamic analysis agent 220 (diagrams 211*a* and 211*b* of FIG. 3).

Accordingly, in operation S110, one or more cryptographic associated functions executed in the application 210 may be identified based on analysis of the code 211, executed when the application 210 is in an operating state, by using the dynamic analysis agent 220.

In this instance, the cryptographic associated function may include a cryptography function that performs algorithm for encryption or decryption and a function affected by security vulnerability of a cryptography function, such as a function that uses the encryption function, or the like.

In association with the same, in operation S110, the cryptographic associated function may be identified using a predetermined rule set or the like. However, the present disclosure is not necessarily limited thereto, and the cryptographic associated function may be selected using various static or dynamic analysis schemes.

Subsequently, in operation S120, a cryptography algorithm list used in the application 210 may be calculated based on the one or more cryptographic associated functions.

More specifically, in operation S120, the dynamic analysis agent 220 may calculate a cryptography algorithm list used in the application 210 by calling and executing an application programing interface (API) of the one or more cryptographic associated functions.

Accordingly, in operation S120, while executing the cryptography associated function, the dynamic analysis agent 220 may calculate the cryptography algorithm list used in the application 210 with reference to a separate configuration file or the like used for executing the cryptographic associated function, in addition to the source code 310 of the application 210.

Accordingly, in operation S130, based on the cryptography algorithm list, quantum vulnerability with respect to the application 210 may be identified.

In this regard, although quantum vulnerability with respect to the application 210 may be identifiable using a predetermined rule set or the like in operation S130, the present disclosure is not necessarily limited thereto, and quantum vulnerability with respect to the cryptography application 210 may be identifiable using various static or dynamic analysis schemes.

Furthermore, the present disclosure may further include an operation (not illustrated) of correcting a code area corresponding to the quantum vulnerability identified in the application 210 that is in the operating state, by using the dynamic analysis agent 220.

Figure 4:
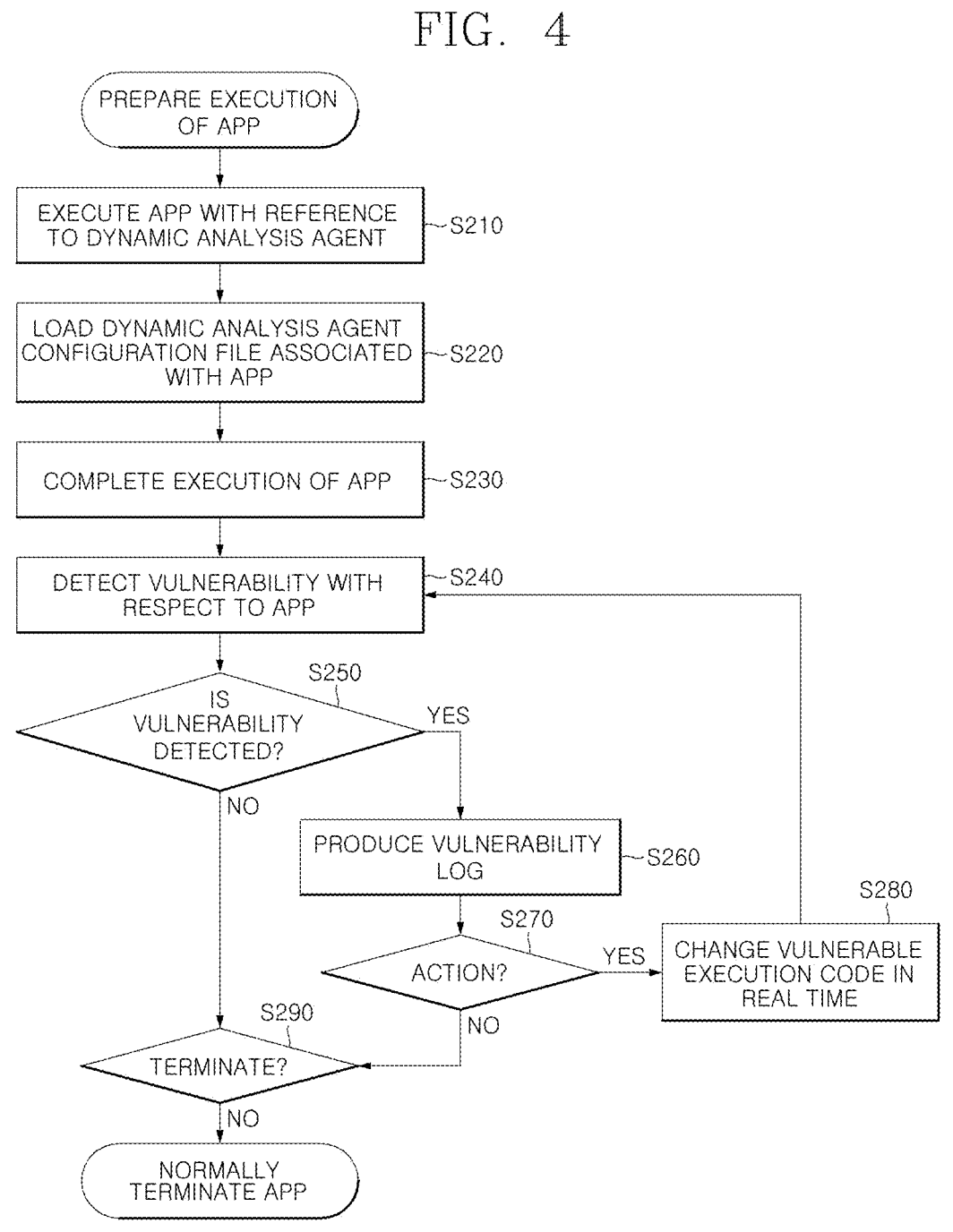

Specifically, FIG. 4 is a flowchart illustrating a quantum vulnerability identifying method according to an embodiment of the present disclosure.

As illustrated in FIG. 4, after performing preparation for executing the application (APP) 210, the method may execute the application 210 with reference to the dynamic analysis agent 220 in operation S210.

In addition, the method may receive and apply the dynamic analysis agent configuration file 320 associated with the application 210 in operation S220.

Subsequently, the method may execute the application 210 in operation S230, and may detect quantum vulnerability with respect to the application in operation S240.

In this instance, upon detection of quantum vulnerability with respect to the application 210 in operation S250, the method may produce a log file 330 associated with e detected quantum vulnerability in operation S260, may determine whether an action for the quantum vulnerability is needed based on the log file 330 in operation S270, and may change and apply, in real time when required, a code area corresponding to the quantum vulnerability of the execution code 211 that is being executed in operation S280.

Conversely, in the case in which the quantum vulnerability with respect to the application 210 is not detected in operation S250, the method may determine whether to terminate detection of quantum vulnerability with respect to the application 210 in operation S290, and may repeatedly perform or terminate detection of quantum vulnerability with respect to the application 210.

In this regard, FIG. 5 is a detailed flowchart illustrating a method of detecting and responding to quantum vulnerability with respect to the application 210.

Referring to FIG. 5, the method loads the execution code 211 associated with the application 210, and may operate the dynamic analysis agent 220 in operation S310.

Subsequently, the method may produce a cryptography algorithm list used in the application 210 while calling and executing an API of a predetermined cryptographic associated function by using the dynamic analysis agent 220 in operation S320.

Subsequently, the method may identify quantum vulnerability with respect to each cryptography algorithm usable in the application 210 by using the cryptography algorithm list in operation S330.

In this instance, in the case in which it is determined that a cryptography algorithm that has quantum vulnerability is used for the application 210, the method may produce the content associated therewith as a log file 330 in operation S340.

For example, a log file associated with a cryptography algorithm (e.g., RSA/2048 or the like) which has quantum vulnerability and is used for a predetermined parameter of a Java security related package or the like may be produced.

Subsequently, with respect to the execution code 211 for the application 210, the method may change algorithm having the identified quantum vulnerability to a post-quantum cryptography (PQC) algorithm (e.g., KYBER/512 or the like) having quantum security in operation S350.

In addition, the changed execution code 211 may be applied to the application 210 so that the changed execution code 211 is recalled, and configuration may be performed not to recall the dynamic analysis agent 220 when the application 210 is recalled in operation S360.

Specifically, detailed embodiments associated with to a quantum vulnerability identifying method of the present disclosure will be described with reference to FIGS. 6 to 9.

As described in FIG. 6, in operation S410, the method recognizes the execution code 211 associated with the application 210 that is being executed.

Specifically, for example, as a recognition item associated with the Java virtual machine (JVM)-based application 210 in the example of FIG. 3, a module name (e.g., module), a method name (e.g., methodB), a method parameter value (e.g., paramC, paramD), a method return value (e.g., valueE), or the like may be included.

In this instance, the code 210 for which recognition is to be performed in the application 210 may be given as below.

(example subject code of recognition) value=moduleA·methodB (paramC, paramD)

Accordingly, in operation S410, the method may recognize the subject code of recognition by using the recognition item.

Subsequently, in operation S420, the method may compare the recognized code item with a predetermined quantum vulnerability detection configuration item.

In this instance, FIG. 7 illustrates the configuration file 320 to configure quantum vulnerability detection.

Accordingly, as illustrated in FIG. 7, the (example subject code of recognition) may be identified as a quantum vulnerability code according to case A of FIG. 7. The method may produce information associated therewith as the log file 330, and may change, in real time, the execution code 211 associated with the application 210 that is being executed.

In this instance, the quantum vulnerability determination and code changing may be performed based on a given security guideline or the like, and, furthermore, configuration or the like may be changed by a user according to the characteristic of the application 210 and may be applied.

In addition, in the present disclosure, the method may configure a sentence including a plurality of method calls as a subject of recognition.

Subsequently, in operation S430, the method may take action by applying a counter plan to the detected quantum vulnerability.

Specifically, for example, FIG. 8 illustrates the configuration file 320 for changing a code in association with the detected quantum vulnerability.

In this instance, the code of which quantum vulnerability is identified may be changed to a post-quantum cryptography (PQC) algorithm having quantum security.

For example, as shown in case A of FIG. 8, when a code with quantum vulnerability is identified, the method may produce information associated therewith as the log file 330, and may change the execution code 211 associated with the currently executed application 210 (e.g., may change parameter RSA/2048 to KYBER/512) in real time.

Conversely, as shown in case B of FIG. 8, when quantum vulnerability is not identified in a subject code of recognition, the method may produce information associated therewith as the log file 330, and may not apply changing of the execution code 211 (e.g., KYBER/512 that already has quantum security is changed).

Accordingly, at the point in time of execution of the execution code 2110, the method may identify a method parameter value, a method return value, or the like, and may perform a defined counter plan.

Figures 9A, 9B:
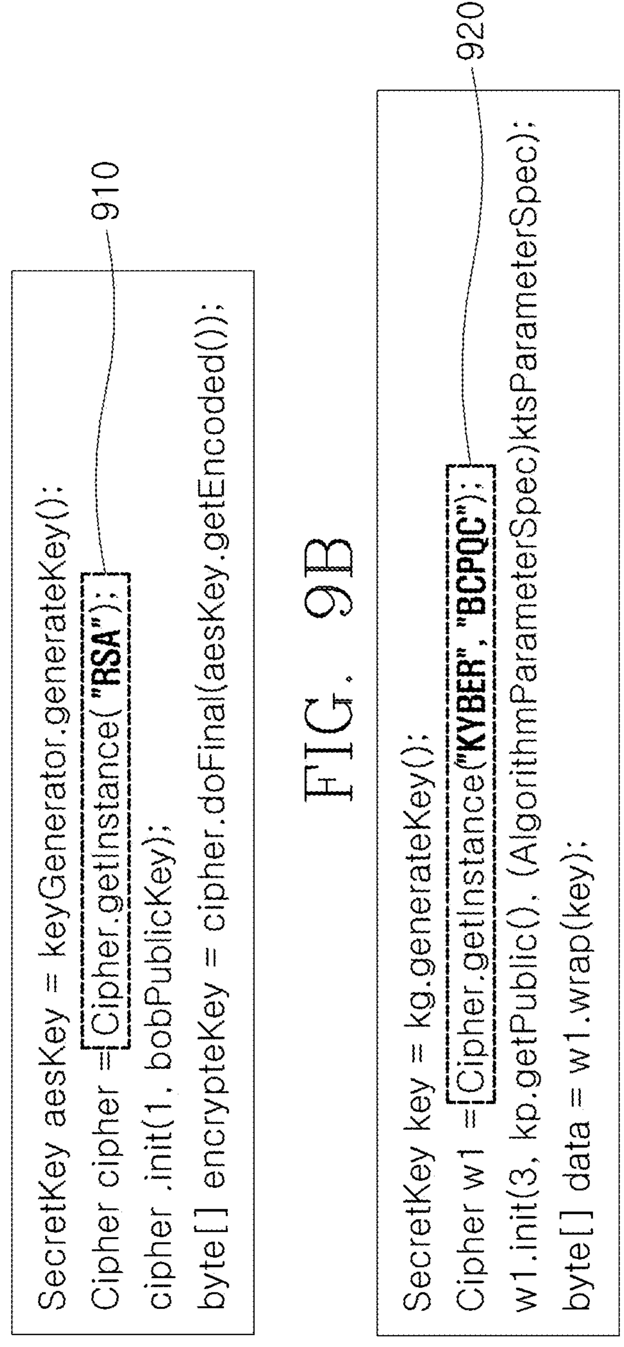

Specifically, for example, FIGS. 9A and 9B illustrate the case of detecting, by using the dynamic analysis agent 220, quantum vulnerability with respect to a byte code of the application 210 that is executed based on a Java virtual machine (JVM) (in this instance, FIGS. 9A and 9B illustrate a byte code, which is an execution code, in a decompiled form.

In this instance, FIG. 9A illustrates the execution code 211 in the case in which RSA that is a cryptography algorithm having quantum vulnerability is used (diagram 910 of FIG. 9A).

Here, the dynamic analysis agent 220 may identify quantum vulnerability of a cryptography algorithm used in the application 210 while calling an API of a cryptography function of a configured module. In this instance, based on a predetermined subject code of recognition, quantum vulnerability with respect to the application 210 may be detected.

In this instance, in the example of FIG. 9A, "RSA" which is a parameter of Cipher.getInstance in a module is identified and thus, the method may produce the log file 330 based on a detection result, may change the execution code 211 of the application 210 in real time, and may change "RSA" to "KYBER" or the like having quantum security and apply the same.

Conversely, FIG. 9B illustrates the execution code 211 in the case in which KYBER that is a cryptography algorithm having quantum security is used (diagram 920 of FIG. 9B).

Here, the dynamic analysis agent 220 may identify quantum vulnerability of a cryptography algorithm used in the application 210 while calling an API of a cryptography function of a configured module. In this instance, based on a predetermined subject code of recognition, quantum vulnerability with respect to the application 210 may be detected.

In this instance, in the example of FIG. 9B, "KYBER" which is a parameter of Cipher.getInstance in a module is identified and thus, the method may produce information associated therewith as the log file 330, and may not apply changing of the execution code 211.

In addition, a computer program according to another aspect of the present disclosure may be a computer program that is stored in a computer-readable medium in order to implement, in the computer, a series of operations of the above-described method of identifying quantum vulnerability with respect to the application 210 in the quantum vulnerability identifying system 100. The computer program may be a computer program including machine code made by a complier and may also be a computer program including a high-level language code executable in a computer by using an interpreter or the like. In this instance, the computer is not limited to a personal computer (PC), a notebook computer, and the like, and may include all information processing devices including a central processing unit (CPU) and capable of executing a computer program, such as a server, a smartphone, a tablet PC, a PDA, a mobile phone, and the like.

In addition, the computer-readable medium may continuously store a computer-executable program, or may temporarily store the same for execution or downloading. In addition, the medium may be one of the various types of recording devices or storage devices provided in a single entity or in a form in which a plurality of pieces of hardware are combined, and the medium is not limited to a medium that directly accesses a predetermined computer system, and may be distributed in a network. Therefore, the detailed description should not be construed restrictively in all aspects, and may be considered as an example. The scope of the present disclosure should be determined by rational interpretation of attached claims, and all modifications made in the scope equivalent to that of the present disclosure should be included in the scope of the present disclosure.

Figure 10:
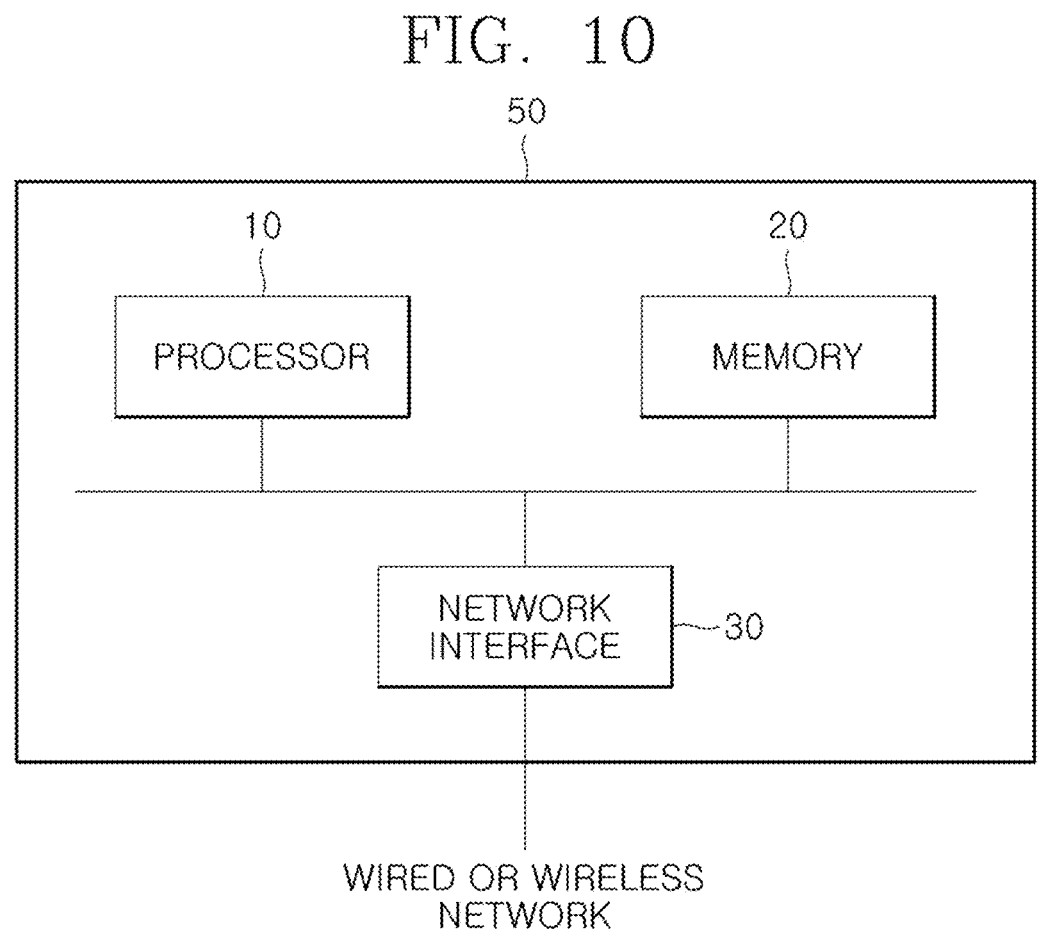

FIG. 10 is a diagram illustrating the apparatus 50 to which a method suggested in the present disclosure is applicable.

Referring to FIG. 10, the apparatus 50 may be configured to embody a process of identifying quantum vulnerability with respect to the application 210 in the quantum vulnerability identifying system 100 according to the proposed method of the present disclosure. For example, the apparatus 50 may be the application server 120 or the quantum vulnerability identifying server 130.

For example, the apparatus 50 to which the method suggested in the present disclosure is applicable may include a network device such as a repeater, a hub, a bridge, a switch, a router, a gateway, and the like, a computer device such as a desktop computer, a workstation, and the like, a mobile terminal such as a smartphone and the like, a portable device such as a laptop computer and the like, electronic appliance such a digital TV and the like, and means of transportation such as a vehicle and the like. As another example, the apparatus 50 to which the present disclosure is applicable may be included as a part of an application specific integrated circuit (ASIC) embodied in the form of a system on chip (SoC).

A memory 20 may be operatively connected to the processor 10, may store programs and/or instructions for processing and controlling the processor 10, and may store data and information used in the present disclosure, control information required for processing data and information according to the present disclosure, and temporary data occurring in a data and information processing process, and the like. The memory 20 may be embodied as a storage device such as a read only memory (ROM), a random access memory (RAM), an erasable programmable read only memory (EPROM), an electrically erasable programmable read-only memory (EEPROM), a flash memory, a static RAM (SRAM), a hard disk drive (HDD), a solid state drive (SSD), and the like.

The processor 10 may be operatively connected to the memory 20 and/or a network interface 30, and may control the operation of each module in the apparatus 50. Particularly, the processor 10 may perform various control functions for implementing the method suggested in the present disclosure. The processor 10 may be also referred to as a controller, a microcontroller, a microprocessor, a microcomputer, and the like. The method suggested in the present disclosure may be embodied by hardware, firmware, software, or a combination thereof. In the case of embodying the present disclosure using hardware, an application specific integrated circuit (ASIC) or a digital signal processor (DSP), a digital signal processing device (DSPD), a programmable logic device (PLD), a field programmable gate array (FPGA), and the like configured to implement the present disclosure may be included in the processor 10. In the case of embodying the method suggested in the present disclosure using firmware or software, the firmware or software may include instructions related to a module that performs functions or operations needed for embodying the method suggested in the present disclosure, a procedure, a function, or the like, and the instructions may be stored in the memory 20 or may be stored in a computer-readable recording medium (not illustrated) separately from the memory 20, and may be configured to enable the apparatus 50 to embody the method suggested in the present disclosure when the instructions are executed by the processor 10.

In addition, the apparatus 50 may include the network interface device 30. The network interface device 30 may be operatively connected to the processor 10, and the processor 10 may control the network interface device 30 so as to transmit or receive a wired/wireless signal that carries information and/or data, a signal, a message, or the like via a wired/wireless network. The network interface device 30 may support various communication standards, for example, IEEE 802 series, 3GPP LTE (-A), 3GPP 5G, and the like, and may transmit or receive control information and/or data signals according to a corresponding communication standard. The network interface device 30 may be embodied outside the apparatus 50 when needed.

Accordingly, a method, apparatus, system, and computer program for identifying and responding to quantum vulnerability with respect to an application by using a dynamic analysis agent according to an embodiment of the present disclosure may efficiently identify and respond to quantum vulnerability with respect to various applications 210, may identify and supplement quantum vulnerability in real time with respect to even the application 210 that currently operates, and may efficiently identify and verify quantum vulnerability with respect to the application 210 in a process of developing the application 210 or a post-development verification process.

The above-described embodiments and drawings in the specification are merely examples, and do not limit the scope of the present disclosure in any way. In addition, connection of lines between components or connected members illustrated in the drawing may be examples of functional connections and/or physical or circuit connections, and may be embodied as various replaceable or additional functional connections, physical connections, or circuit connections in a real device. Unless there is no word specifically mentioned such as "essential", "importantly", or the like, a corresponding component may not be essential component for applying the present disclosure.

In the specification (particularly, claims) of the present disclosure, the term "the" and demonstrative terms which are similar thereto may correspond to both singularity and plurality. In addition, if the present disclosure specifies a range, the present disclosure includes an invention to which individual values falling within the range are applied (unless otherwise noted), and it is construed that the detailed description of the present disclosure specifies individual values included in the range. In addition, the present disclosure may not intend to necessarily restrict the order of operations provided in the method of the present disclosure, and the order may be changed appropriately unless one operation needs to be performed necessarily preferentially according to the essence of each process. The use of all examples or terms (e.g., or the like) in the present disclosure is merely to describe the present disclosure in detail, and the scope of the present disclosure is only limited by claims but not limited to the examples or terms. In addition, those skilled in the art will understand that the various modifications, combinations, and changes may be made based on design conditions and factors within the scope of claims or equivalents thereof.

What is claimed is:

1. A method of identifying quantum vulnerability with respect to an application by using a computing apparatus, the method comprising:

identifying one or more cryptography-associated functions performed in an application while the application executes in an operating state and based on analysis of a code, executed while the application is in an operating state, by using a dynamic analysis agent corresponding to the application;

based on the one or more cryptography-associated functions, calculating a runtime cryptography algorithm list used in the application by intercepting application-programming-interface (API) calls made by the application to cryptography libraries and extracting, from arguments passed to the APIs during execution, algorithm identifiers actually used at runtime; and based on the cryptography algorithm list, identifying quantum vulnerability with respect to the application.

2. The method of claim 1, further comprising correcting, by using the dynamic analysis agent, a code area corresponding to the quantum vulnerability identified in the application that is in the operating state.

3. The method of claim 1, wherein the dynamic analysis agent is configured to identify quantum vulnerability with respect to the application by using a rule set configured based on a predetermined configuration file for the application.

4. The method of claim 1, wherein the application and the dynamic analysis agent are configured to interoperate with each other in one same process.

5. The method of claim 4, wherein the dynamic analysis agent is configured to identify quantum vulnerability with respect to the application that is in the operating state by using intercepting for the application.

6. The method of claim 2, wherein the corrected code area is applied to the application, and wherein configuration is made so that, upon subsequent recalls of the application, the application executes the corrected code without loading the dynamic analysis agent.

7. The method of claim 2, wherein a degree of effect on the application is verified by using a code to which the corrected code area is applied by executing, in parallel, an instance with the corrected code and an instance without the corrected code and comparing results to confirm functional equivalence.

8. The method of claim 1, wherein, in the calculating, the dynamic analysis agent calculates a cryptography algorithm list used for the application specifically while calling and executing an API of the one or more cryptography-associated functions and logging the algorithm identifiers passed to the API at runtime.

9. A server comprising a processor and a memory, and configured to identify quantum vulnerability with respect to an application, wherein the memory comprises instructions configured to cause, when executed by the processor, the server to perform a predetermined operation comprising:

identifying one or more cryptography-associated functions executed in the application while the application executes in an operating state and based on analysis of a code, executed while the application is in an operating state, by using a dynamic analysis agent corresponding to the application;

calculating, based on the one or more cryptography-associated functions, a runtime cryptography algorithm list used in the application by intercepting API calls made by the application to cryptography libraries and extracting, from arguments passed to the APIs during execution, algorithm identifiers actually used at runtime; and identifying, based on the cryptography algorithm list, the quantum vulnerability with respect to the application by comparing the extracted algorithm identifiers to a configuration-file-defined rule set and, responsive to a vulnerable algorithm, rewriting at runtime a corresponding code region to invoke a PQC algorithm and persisting the rewritten code such that subsequent executions of the application omit loading the dynamic analysis agent.

10. The server of claim 9, wherein the predetermined operation further comprises correcting, by using the dynamic analysis agent, a code area corresponding to the quantum vulnerability identified in the application that is in the operating state.

11. The server of claim 9, wherein the dynamic analysis agent is configured to identify the quantum vulnerability with respect to the application by using a rule set configured based on a predetermined configuration file for the application.

12. The server of claim 9, wherein the application and the dynamic analysis agent are configured to interoperate with each other in one same process.

13. The server of claim 12, wherein the dynamic analysis agent is configured to identify the quantum vulnerability with respect to the application that is in the operating state, by using intercepting for the application.

14. The server of claim 10, wherein the corrected code area is applied to the application, and wherein configuration is made so that, upon subsequent recalls of the application, the application executes the corrected code without loading the dynamic analysis agent.

15. The server of claim 10, wherein a degree of effect on the application is verified using a code to which the corrected code area is applied by executing, in parallel, an instance with the corrected code and an instance without the corrected code and comparing results to confirm functional equivalence.

16. The server of claim 9, wherein, in the calculating, the dynamic analysis agent is configured to calculate a cryptography algorithm list used for the application specifically while calling and executing an API of the one or more cryptography-associated functions and logging the algorithm identifiers passed to the API at runtime.

17. A non-transitory computer-readable storing medium that stores instructions configured to, when executed by a processor, cause a server to implement a predetermined operation, the server including the processor and identifying quantum vulnerability with respect to an application, and the predetermined operation comprising:

identifying one or more cryptography-associated functions executed in the application based on analysis of a code, executed when the application is in an operating state, by using a dynamic analysis agent corresponding to the application;

based on the one or more cryptography-associated functions, calculating a runtime cryptography algorithm list used in the application by intercepting API calls to cryptography libraries and extracting algorithm identifiers passed at runtime; and based on the cryptography algorithm list, identifying quantum vulnerability with respect to the application by consulting a configuration-file-defined rule set and, responsive to identifying a vulnerable algorithm, rewriting a corresponding code region at runtime to invoke a PQC algorithm and persisting the rewritten code for subsequent executions without loading the dynamic analysis agent.

* * * * *